US009438809B2

(12) United States Patent
Sheikh et al.

(10) Patent No.: US 9,438,809 B2
(45) Date of Patent: Sep. 6, 2016

(54) METHODOLOGY FOR GENERATING HIGH FIDELITY DIGITAL ZOOM FOR MOBILE PHONE CAMERAS

(71) Applicant: Samsung Electronics Co., Ltd., Suwon-si, Gyeonggi-do (KR)

(72) Inventors: Hamid R. Sheikh, Allen, TX (US); John W. Glotzbach, Allen, TX (US); Osman G. Sezer, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/690,046

(22) Filed: Apr. 17, 2015

(65) Prior Publication Data

US 2016/0028966 A1    Jan. 28, 2016

Related U.S. Application Data

(60) Provisional application No. 62/029,106, filed on Jul. 25, 2014.

(51) Int. Cl.
| | |
|---|---|
| *H04N 5/262* | (2006.01) |
| *H04N 5/232* | (2006.01) |
| *G06K 9/46* | (2006.01) |
| *G06T 3/00* | (2006.01) |
| *G06T 3/60* | (2006.01) |
| *H04N 5/265* | (2006.01) |
| *G06T 5/50* | (2006.01) |
| *G06T 7/20* | (2006.01) |
| *G06T 3/40* | (2006.01) |

(52) U.S. Cl.
CPC ............ *H04N 5/23296* (2013.01); *G06K 9/46* (2013.01); *G06T 3/0006* (2013.01); *G06T 3/4007* (2013.01); *G06T 3/60* (2013.01); *G06T 5/50* (2013.01); *G06T 7/20* (2013.01); *H04N 5/23232* (2013.01); *H04N 5/265* (2013.01); *G06T 2200/12* (2013.01); *G06T 2207/20024* (2013.01); *G06T 2207/20182* (2013.01); *G06T 2207/20212* (2013.01)

(58) Field of Classification Search
None
See application file for complete search history.

*Primary Examiner* — Roberto Velez
*Assistant Examiner* — Stephen Coleman (57) ABSTRACT

A mobile device includes an embedded digital camera that is configured to capture a burst of N images. The mobile device includes processing circuitry comprising a registration module configured to, for each image within the burst of images: analyze an amount of warp of the image and generate a set of affine matrices indicating the amount of warp of the image. The processing circuitry includes a High Fidelity Interpolation block configured to, for each image within the burst of images: perform affine transformation using the set of affine matrices associated with the image, apply an aliasing-retaining interpolation filter, and implement rotation transformation and sub-pixel shifts, yielding an interpolated image. The processing circuitry includes a blending module configured to receive the N interpolated images and blend the N interpolated images into a single-blended image having a user-selected digital zoom ratio.

20 Claims, 5 Drawing Sheets

METHODOLOGY FOR GENERATING HIGH FIDELITY DIGITAL ZOOM FOR MOBILE PHONE CAMERAS

CROSS-REFERENCE TO RELATED APPLICATION(S) AND CLAIM OF PRIORITY

The present application claims priority to U.S. Provisional Patent Application Ser. No. 62/029,106, filed Jul. 25, 2014, entitled "METHODOLOGY FOR GENERATING HIGH FIDELITY DIGITAL ZOOM FOR MOBILE PHONE CAMERAS." The content of the above-identified patent document is incorporated herein by reference.

TECHNICAL FIELD

The present application relates generally to electronic imaging devices, and more specifically, to combining multiple images to generate an artifact free higher quality composite image.

BACKGROUND

Photography and camera users can benefit from a zoom capability of the camera and camcorder devices to achieve desired scene framing. Standalone cameras typically include optical zoom capabilities to achieve the effect of scene framing. Smartphone cameras are limited in thickness and cannot accommodate optical zoom systems, but instead and must rely on digital zoom technology to achieve the effect of scene framing.

Digital zoom technology on current smartphones does not provide good quality for high zoom factors, such as 4× zoom. There are many annoying quality problems including artifacts, noise, loss of detail, and unnaturalness. These quality problems result from the fact that high quality digital zoom requires sophisticated image processing technology that is computationally expensive, and the fact that typical digital zoom (or upscale) algorithms do not handle high zoom ratios very well.

SUMMARY

This disclosure provides an apparatus and method for generating High Fidelity Digital Zoom for mobile phone cameras.

In a first embodiment, a non-transitory computer readable medium embodying a computer program is provided. The computer program includes computer readable program code that, when executed by processing circuitry, causes the processing circuitry to capture, by a digital camera, a burst of N images. The computer program includes computer readable program code that, when executed by processing circuitry, causes the processing circuitry to, for each image within the burst of images: analyze an amount of warp of the image and generate a set of affine matrices indicating the amount of warp of the image, generate an interpolated image, and blend the N interpolated images into a single-blended image having a user-selected digital zoom ratio. Generating an interpolated image includes performing affine transformation using the set of affine matrices associated with the image. Generating an interpolated image includes applying an aliasing-retaining interpolation filter. Generating an interpolated image also includes implementing rotation transformation and sub-pixel shifts.

In a second embodiment, a mobile device includes an embedded digital camera that is configured to capture a burst of N images. The mobile device includes processing circuitry comprising a registration module configured to, for each image within the burst of images: analyze an amount of warp of the image and generate a set of affine matrices indicating the amount of warp of the image. The processing circuitry includes a High Fidelity Interpolation block configured to, for each image within the burst of images: perform affine transformation using the set of affine matrices associated with the image, apply an aliasing-retaining interpolation filter, and implement rotation transformation and sub-pixel shifts, yielding an interpolated image. The processing circuitry includes a blending module configured to receive the N interpolated images and blend the N interpolated images into a single-blended image having a user-selected digital zoom ratio.

In a third embodiment, system includes processing circuitry configured to couple to a mobile device comprising an embedded digital camera configured to capture a burst of N images. The processing circuitry comprises a registration module configured to, for each image within the burst of images: analyze an amount of warp of the image and generate a set of affine matrices indicating the amount of warp of the image. The processing circuitry comprises a High Fidelity Interpolation block configured to, for each image within the burst of images: perform affine transformation using the set of affine matrices associated with the image, apply an aliasing-retaining interpolation filter, and implement rotation transformation and sub-pixel shifts, yielding an interpolated image. The processing circuitry comprises a blending module configured to receive the N interpolated images and blend the N interpolated images into a single-blended image having a user-selected digital zoom ratio.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Examples of single frame interpolation methods for implementing digital zoom include bilinear interpolation, bicubic interpolation, or other directionally adaptive interpolation. These methods operate on single frame only.

There are multi-frame interpolation methods for implementing digital zoom that rely on complicated iterative algorithms. These iterative multi-frame interpolation methods are not suitable for implementation on mobile phones due to the computational complexity of iterative algorithms. Moreover, these iterative algorithms cannot handle moving objects as the moving objects move from frame to frame.

Embodiments of the present disclosure provide a methodology of producing High Fidelity (HiFi) Digital Zoom images on mobile phones. Embodiments of the present disclosure provide an improved user interface, a system use case implementation, and a multi-frame computational imaging algorithm to improve the quality of digitally zoomed images. Embodiments of this disclosure also provide the application, a user experience design, camera firmware configuration, algorithm and implementation for enabling a combining of multiple images to generate artifact free high quality image as well as a multi-frame registration system for aligning and blending image captures. Embodiments of this disclosure also produce zoomed images that have better image rendering, improved noise profile, more natural texture rendering, and improved clarity of objects in the zoomed image. The multi-frame computational imaging algorithm is able to handle moving objects in the scene as well as camera motion from frame to frame. The multi-frame computational imaging algorithms perform well in terms of computational complexity and memory footprint in embedded implementations (for example, embedded in a mobile phone).

By way of comparison to the single frame interpolation methods and to the iterative multi-frame interpolation methods of implementing digital zoom, the embodiments of this disclosure not only produce high quality images, but also do not suffer from the complexities and limitations of existing multi-frame methods described above. As such, embodiments of the present disclosure provide the user with significantly better user experience.

Figure 1:
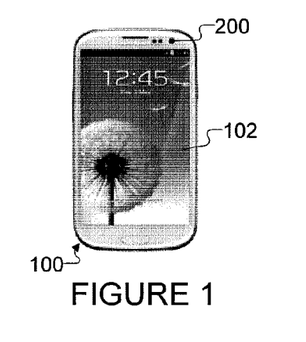
FIG. 1 illustrates an example user equipment for generating High Fidelity Digital Zoom for a mobile phone camera according to this disclosure.

FIG. 1 illustrates an example user equipment (UE) for generating High Fidelity Digital Zoom for a mobile phone camera according to this disclosure. Although certain details will be provided with reference to the components of the user equipment 100, it should be understood that other embodiments may include more, less, or different components.

The UE 100 includes a display 102 and an embedded camera 200 disposed on the front side of the UE. The display 102 displays information of an application executed by the processing circuitry of the UE 100. The camera 200 captures images in a high resolution digital format, but the camera 200 is not configured to perform an optical zoom. The UE 100 includes processing circuitry, including one or more processors and memory, configured to control an operation of the UE 100, control an operation of the display 102 and control and operation of the camera 200. The UE 100 can include independent processing circuitry 100 for each of the display 102, camera 200 and for control of the UE 100 that are configured to intercommunicate and cooperate with each other to perform one or more functions described herein. In certain embodiments, one of more of the display 102, camera 200 and UE 100 control functions are performed by a common, or shared, processing circuitry.

Figure 2:
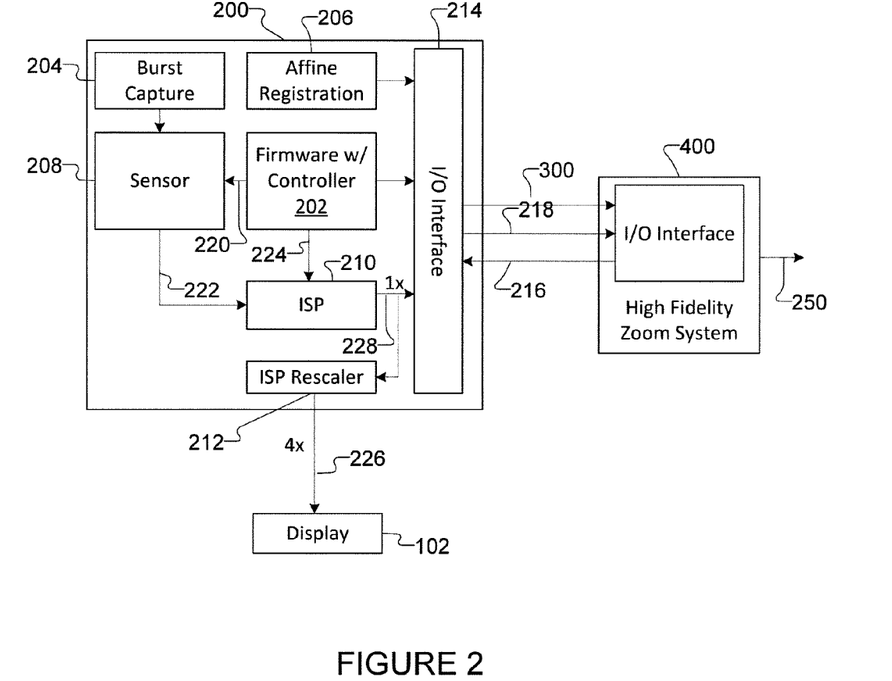
FIG. 2 illustrates a block diagram of components within the user equipment of FIG. 1 for implementing the High Fidelity Digital Zoom.

FIG. 2 illustrates a block diagram of components within the user equipment of FIG. 1 for implementing the High Fidelity Digital Zoom. The embodiment of components within the UE 100 shown in FIG. 2 is for illustration only. Other embodiments could be used without departing from the scope of the present disclosure.

The camera 200 includes a camera controller with firmware 202, burst capture module 204, an affine registration module 206, a sensor 208, an image signal processor (ISP) 210, an ISP rescaler 212, and an input/output (I/O) interface 214. The camera 200 is connected to the High Fidelity Digital Zoom system 400 in order to operate in a High Fidelity Zoom mode ("HiFi mode") and to receive control signals 216 from, and send control signals 218 and a burst of images 300 to the HiFi Digital Zoom system 400. The I/O interface 212 receives data from and sends data to the I/O interface of the HiFi Digital Zoom system 400.

High Fidelity Zoom is a special mode on a camera application of a mobile phone or UE 100. High Fidelity Zoom mode can be automatically selected based on zoom ratio (for example, >2×) or automatically selected based on a photographic mode or selected manually by the user. Herein, automatic refers to action resulting from a prior operation without human operator intervention. For example, the camera 200 can automatically (namely, without human interaction) select to operate in HiFi mode in response to a determination that the zoom ratio exceeds a threshold value. The threshold value may indicate a maximum zoom ratio of the non-HiFi normal mode of the camera. Once the HiFi mode is selected and the user zooms in to take a picture, the camera application engages the focus, locks (i.e., prevents from changing) exposure and color control, switches sensor mode back to a 1× zoom ratio, configures the camera firmware to an application-specific "tuning" parameter set, and captures a burst of images 300. Despite the fact that the user tries determinedly to keep the camera stable, the user cannot avoid micro-movements of the camera. These micro-movements cause the camera 200 to capture the burst of images 300 wherein each image is from a slightly different position. While the burst of images 300 is being captured, the camera application can indicate to the user to not to move the phone away from the scene of which the images are being captured. Once the High Fidelity Zoom algorithm (also referred to as a multiple stage zoom algorithm described more particularly below in reference to FIG. 4) has been applied to the burst of images, the resulting composite image 250 is displayed to the user or saved in the memory of the UE 100 for the camera application photo gallery.

The camera controller with firmware 202 includes signal processing circuitry and a memory within the UE 100 that stores program code that provides the control program of the camera 200. The camera controller with firmware 202 controls the functions of each of the other camera components 208-214 using control signals or control parameters. In HiFi mode, the camera application configures the camera firmware 202 to perform auto-exposure lock, auto-focus lock, and auto-white/color balance lock (collectively called 3A lock) while the burst of images is captured. For example, the camera firmware 202 sends sensor control parameters 220 to the sensor 208 to implement the 3A lock while capturing a burst of images. The 3A lock ensures that the High Fidelity Zoom algorithm does not have to normalize the individual images within the burst 300 for variations in brightness or colors across the set of images in the burst 300. The 3A lock removes the need for brightness normalization, color normalization, and scale normalization in multi-frame blending algorithms.

In a non-HiFi mode, when the user zooms in to take a picture, the image output from the ISP 210 is output from the ISP Rescaler 212 at the selected zoom ratio (for example, 1.3×) that is greater than 1×. In HiFi mode, the camera application instructs the camera firmware 202 to switch mode back to a 1× zoom ratio and output smaller resolution buffers. More particularly, when the user zooms in to take a picture at a zoom ratio (for example, 4×) high enough for the camera 200 to implement HiFi mode, the firmware 202 generates ISP control parameters 224 that cause the ISP 210 to output each image in the burst of images 300 at a 1× zoom ratio. The 1× resolution images enable the High Fidelity Digital Zoom system 400 to perform interpolation and processing on the burst of images 300. The camera application reconfigures the camera firmware 202 to generate "tuning" parameters 224 that are more suitable for image texture retention. The custom "tuning" parameters 224 include parameters for defect pixel correction, noise filtering, color filter array interpolation (demosaicing), sharpness enhancement, and so forth. These custom tuning parameters 224 retain image information but may produce undesirable image effects in a single image 228. The undesirable effects are mitigated through blending of multiple frames, while the benefits (improved texture rendition) are not reduced by multi-frame blending. Re-configuration of the camera firmware 202 enables the ISP 210 to perform reduced noise filtering, reduced pixel defect correction, and reduced interpolation aliasing cancellation. Re-configuration of the camera firmware 202 causes the ISP 210 to generate poorer quality images compared to a normal photo capture scenario, but also, the High Fidelity Digital Zoom system 400 produces a higher fidelity output composite image 250 by blending multiple images of the burst of images 300. As described more particularly below with reference to FIG. 4, the blending operation effectively includes noise filtering, defect pixel reduction, and aliasing reduction. The ISP tuning parameters 224 cause each image of the burst 300 to have poorer quality than the blended output composite image 250.

The burst capture module 204 enables the camera 200 to capture a burst of images 300 also referred to as a burst of frames). More particularly, the burst capture module 204 enables the camera 200 to rapidly capture several photographs in succession. For example, the burst capture module 204 enables the camera 200 to capture to 30 frames per second. In certain embodiments, the burst capture module 204 enables the camera 200 to captured 5 frames within 150 milliseconds (ms). The burst capture module 204 stores each burst of images 300 in a memory in the UE 100. In certain embodiments, the burst capture module 204 enables the camera 200 to continuously capture images in quick succession. In certain embodiments, the burst capture module 204 enables the camera to capture a burst of images in response to a user input, such as pressing a shutter button or holding the shutter button. When the camera operates in HiFi mode, the burst capture module 204 enables to the sensor 208 to rapidly capture images.

The sensor 208 can be an image sensor that captures an image 222 by converting light to an electric signal. The sensor 208 receives sensor control parameters 220 from the camera controller with firmware 202 to control the exposure, white/color balance, and focus. In HiFi mode, in response to receiving sensor control parameters 220, the sensor 208 implements the 3A lock while capturing each of the images during the burst capture period.

The ISP 210 receives each raw image 222 captured by the sensor 208 and receives parameters 224 to control the quality of the images output from the ISP 210. Based on the parameters 224, the ISP 210 leaves the images in raw format or improves the quality of each raw image 222 by applying a noise reduction filter, a defect pixel correction, a color filter array interpolation (for example, demosaicing), and a sharpness enhancement process. The ISP outputs the processed image 228 to the HiFi Digital Zoom system 400. The parameters 224 can be generated by and received from the HiFi Digital Zoom system 400 or the camera controller with firmware 202. In the non-HiFi mode, the ISP 210 receives parameters 224 from the camera controller with firmware 202, which are parameters that cause the ISP 210 to remove noise and aliasing from images and to output high quality images. As described more particularly below, the HiFi Digital Zoom system 400 includes one or more pre-processing components, such as a noise filter and a pre-sharpener. Accordingly, when operating in the HiFi mode, the camera 200 need not duplicate the noise and aliasing removal that occurs in the pre-processing components of the HiFi Digital Zoom system 400. In certain embodiments, the noise filtering and pre-sharpening is part of the ISP 210, which can be placed under appropriate control of the HiFi system. That is, in the HiFi-mode, the ISP 210 receives parameters 224 from the HiFi Digital Zoom system 400, which are parameters that cause the ISP 210 to remove a lesser amount of noise and aliasing than the amount of noise and aliasing that would be removed by the parameters generated by the camera controller with firmware 202. In certain embodiments, parameters 224 from the HiFi Digital Zoom system 400 cause the ISP 210 to bypass the noise removal, the aliasing removal, or both noise and aliasing removals. Accordingly, the images output from the ISP 210 in HiFi mode may have more noise or aliasing than the images output from the ISP 210 in non-HiFi mode.

The ISP rescaler 214 rescales the resolution of the image output from the ISP 210 to a user-selected zoom ratio (for example, 1.2× or 4×) and provides the resealed image 226 to the display 102. In non-HiFi mode, the ISP rescaler 214 additionally sends the resealed image 226 to the memory of the UE 100 for saving in the camera application photo gallery. In certain embodiments, the ISP rescaler 214 is included within the ISP 210. When the ISP 214 is part of the ISP 210, in HiFi mode, the ISP 210 outputs the image to the I/O interface 214 at a 1× resolution and outputs the image at a selected resolution (for example, 4×) to the display 102 of the UE 100 through the ISP rescaler 212.

The affine registration module 206 detects uniform distortion between images and registers a set of points where the distortion is present. For example, when the UE 100 is in the hand of a user while capturing multiple images of the same scene, a first image of the scene is captured while the camera 200 was horizontally level at a 0° angle, yet due to a slight movement of the user's body, the camera moves to a 3° angle to capture the second image of the scene. The affine registration module 206 can use the first image as a reference frame to detect the points in the second image of the scene that are slightly displaced compared to the position of the point in the first image reference frame. The affine registration module 206 receives each image 222 captured by the sensor 208, and then outputs camera affine information including the set of displaced points and the corresponding amounts by which the displaced points were linearly and/or angularly translated. In certain embodiments the High Fidelity Digital Zoom system 400 receives and uses the camera affine information to perform a HiFi registration process.

The HiFi Digital Zoom system 400 receives a burst of images 300 from the camera 200, and then uses the burst of images 300 to generate a composite image 250. The HiFi Digital Zoom system applies a multiple stage zoom algorithm to the burst of images 300. The multiple stage zoom algorithm includes a multiple-stage blending algorithm and a single-frame interpolation algorithm. The multiple-stage blending includes an alignment estimation stage, and an interpolation and blending stage. The HiFi Digital Zoom system 400 is described if further detail in reference to FIG. 4.

In the example shown, the camera firmware 202 implements the HiFi Zoom as the last stage of the image processing pipeline, after the images are captured, and after the ISP 210 makes corrections to the image. In other embodiments, the HiFi Zoom can be an intermediate stage, or the first stage of the processing pipeline.

Figure 3:
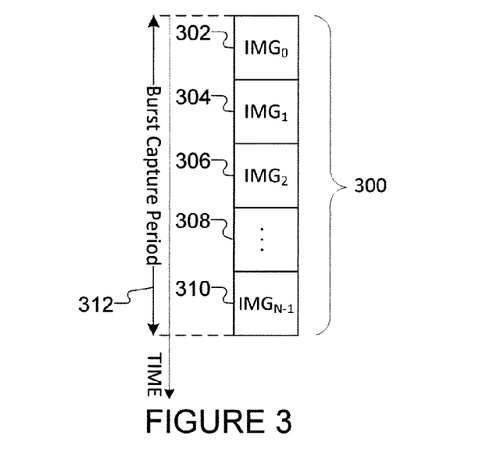
FIG. 3 illustrates a burst of images captured according to this disclosure.

FIG. 3 illustrates a burst of images captured according to this disclosure. The embodiment of the burst of images 300 shown in FIG. 3 is for illustration only. Other embodiments could be used without departing from the scope of the present disclosure.

The burst of images 300 includes a number N of images. For example, if N=5, then the burst of images 300 includes a first image 302 ($IMG_0$), a second image 304 ($IMG_1$), a third image 306 ($IMG_2$), a fourth or penultimate image 308 (also shown by an ellipsis indicating images between the third and last images of the burst), and a fifth or last image 310 ($IMG_{N-1}$). The camera 200 captures the burst of images during a burst capture period 312, which represents the amount of time that elapses from the time the camera 200 commences to capture the first image 302 and the time the camera 200 finishes capturing the last image 310 of the burst.

Figure 4:
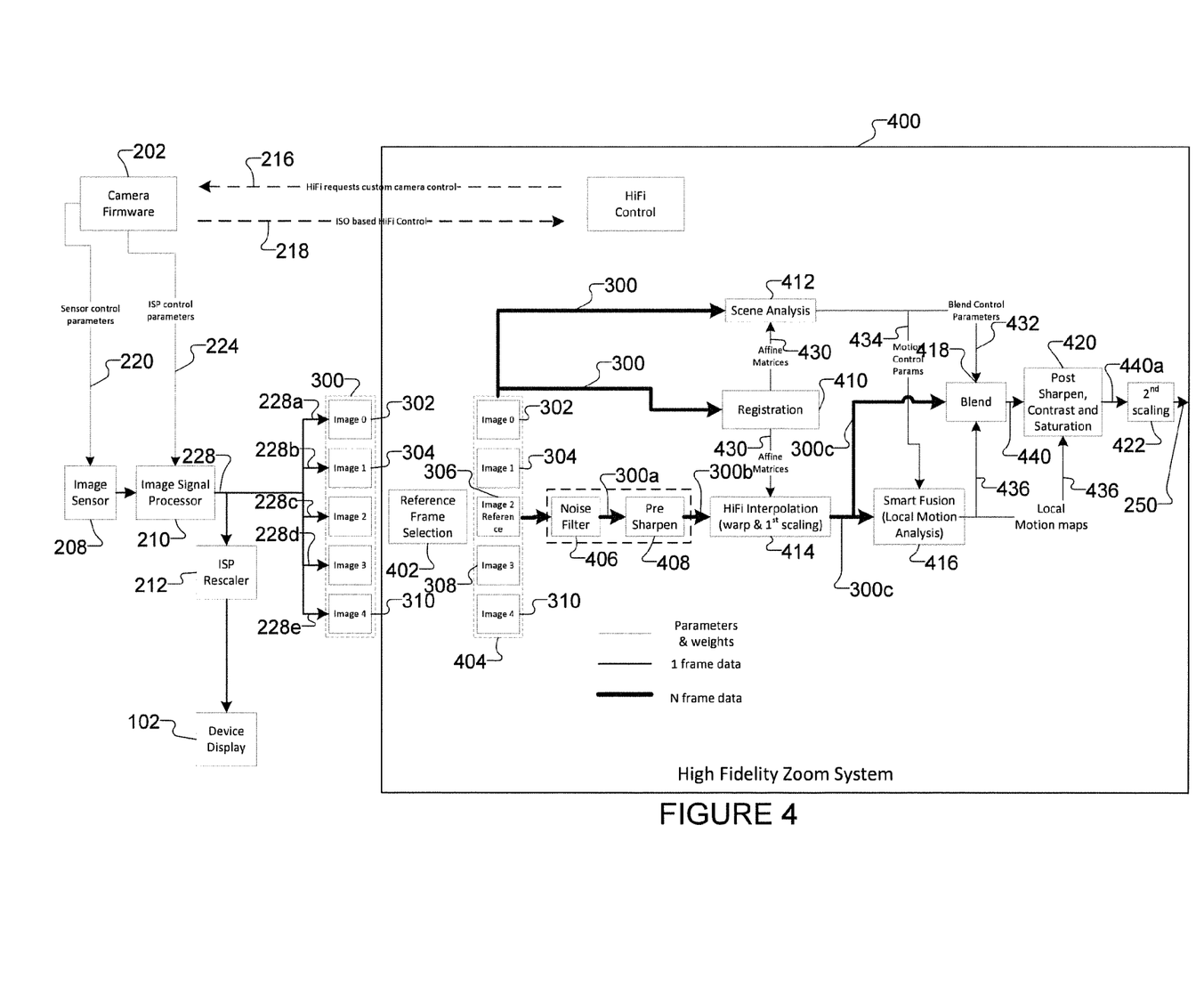
FIG. 4 illustrates a block diagram of a High Fidelity Digital Zoom system according to this disclosure.
Figure 5:
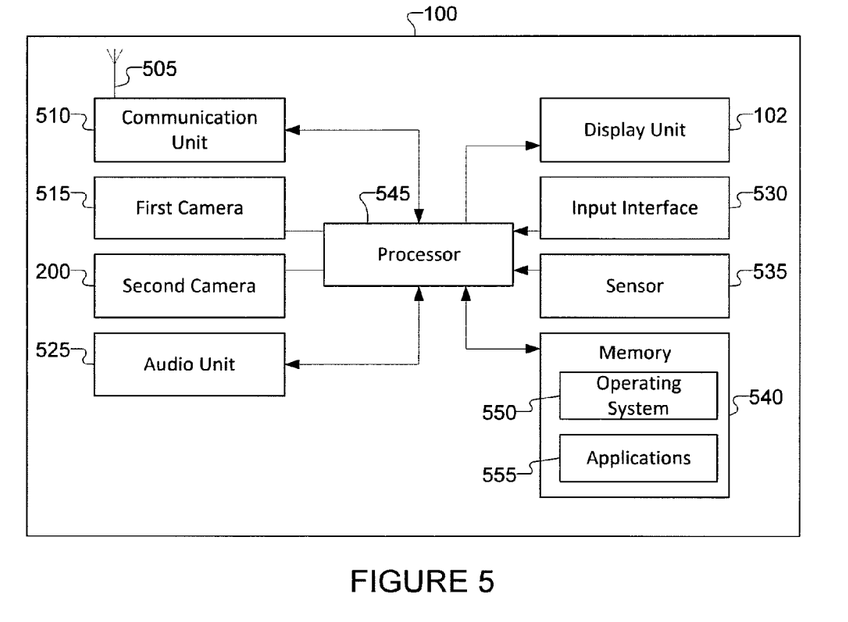
FIG. 5 illustrates a block diagram of a configuration of the user equipment of FIG. 1 in accordance with this disclosure.

FIG. 4 illustrates a block diagram of a High Fidelity Digital Zoom system according to this disclosure. The embodiment of the High Fidelity Digital Zoom system 400 shown in FIG. 5 is for illustration only. Other embodiments could be used without departing from the scope of the present disclosure.

The High Fidelity Digital Zoom system 400 receives the burst of images 300 from the camera 200. For example, for each image captured during the burst capture period 312, the ISP 210 provides the processed image 228 to a buffer that stores the N processed images 302-310. That is, during processing of the burst of images 300, a first processed image 228a is stored in the buffer as the first image 302 (Image 0), and in a similar manner, subsequently processed images 228b-228e are stored in the buffer as the second through $(N-1)^{th}$ image 304-310 (Image 1, Image 2, Image 3, and Image 4).

The High Fidelity Digital Zoom system 400 relies on the fact that when a hand-held camera performs a high speed burst capture of a scene, each image is captured from a slightly different position of the camera due to slight handshake of the user. The multiple stage zoom algorithm contains two or more stages of processing blocks: an image alignment estimation stage and an interpolation/blend stage. The image alignment estimation stage performs registration of the multiple frames in the burst of images 300. In certain embodiments, the first frame 302 in the burst sequence 300 is considered to be the reference frame, and all other frames in the burst 300 are registered with the reference frame using standard image registration methods of feature detection, tracking, and transformation estimation. The Interpolation/Blend stage uses the result of the transform estimation.

The High Fidelity Digital Zoom system 400 includes a reference frame selection module 402, a buffer 404, a pre-processing block including a noise filter 406 and a pre-sharpener 408, a registration module 410, a scene analysis block 412, a HiFi Interpolation block 414, a Local Motion Analysis block (also referred to as a Smart Fusion block) 416, a blending module 418, a post-processing block

420, and a second scaling block 422. The components of the High Fidelity Digital Zoom system 400 can be implemented by one or more processors, a processor array, with suitable memory and instructions contained therein, or any suitable processing circuitry configured to perform the functions of the respective component blocks, either independently or collectively.

The reference frame selection module 402 selects a reference frame from the burst of images 300. After making the selection, the reference frame selection module 402 can store the reference frame in a buffer 404 to provide access to the pre-processing block and to components of the image alignment estimation stage. The reference frame selection module 402 can select the first frame 302 received by the High Fidelity Digital Zoom system 400 to be the reference frame in order to reduce performance time (namely, the amount of time between receiving the first frame 302 into the High Fidelity Digital Zoom system 400 and outputting the composite image 250). Waiting to receive subsequent images 304-310, which serially processing through the ISP 210, before selecting a reference frame increases performance time. Alternatively, the reference frame selection module 402 can analyze the sharpness of all of the images in the burst 300 and selected the sharpest frame to be the reference frame. The reference frame selection module 402 selects the sharpest frame in order to establish a high threshold to which the non-reference images are compared to increase the quality of the composite image 250. As shown, the reference frame selection module 402 can select the middle frame 306 to be the reference frame, for example, by selecting the third image 306 (Images 2 Reference) when the burst of images 300 includes N=5 images. In certain embodiments, the reference frame selection module 402 selects a specified frame number to be the reference frame. Examples of specified frame numbers include the $N^{th}$ frame (i.e., last frame), the middle frame ($N/2^{th}$), the first frame, or any other frame number within the burst of N images. In certain embodiments, the reference frame selection module 402 selects as the reference frame the image having the least motion difference from other images in the burst of N images 300. For example, the reference frame selection module 402 uses the affine information output from the affine registration module 206 of the camera 200 to determine the image having least displacement or least motion difference. In certain embodiments, the reference frame selection module 402 selects the sharpest frame when the High Fidelity Digital Zoom system 400 has received at least half of the burst of images 300, thereby reducing performance time compared to selecting from the all images in the burst and increasing image quality compared to selecting the first frame, which may not be the sharpest.

The pre-processing block improves the process of implementing the later stages, such as the image alignment estimation stage and interpolation and blending stage. The noise filter 406 removes noise from each image in the burst of images 300. Accordingly, the noise filter 406 reduces the amount of noise processed within the later stages. The output from the noise filter 406 is a noise-filtered version 300a of the burst of images having N images. Accordingly, the pre-sharpener 408 reduces the amount of blur processed within the later stages. The output from the pre-sharpener 408 is a pre-sharpened version 300b of the burst of images having N images.

The image alignment estimation stage includes the registration module 410, and the scene analysis block 412. In certain embodiments, image alignment estimation stage uses feature detectors and tracking for image registration and alignment. That is, the image alignment estimation stage jointly uses feature detection and tracking and local motion estimation.

The registration module 410 analyzes the burst of images 300 for warp and generates a set of affine matrices 430 for each image within the burst of images, for a total of N sets of affine matrices. For each image 302-310, the set of affine matrices 430 indicates an amount by which each image is warped compared to the reference image 306. More particularly, the set of affine matrices 430 indicate the displaced points within the non-reference image and the corresponding amounts by which the displaced points were linearly and/or angularly translated compared to the reference image. The registration module 410 sends the affine matrices 430 of each image to the HiFi Interpolation block 414, where the linear or angular translation of the displaced points is corrected.

The scene analysis block 412 determines an amount of motion occurring within the scene captured in the burst of images. The scene analysis block 412 receives the affine matrices 430 from the registration module 410, and uses the affine matrices 430 to avoid interpreting warp as object motion within a scene. For example, if the user uses the burst capture to take a picture of a mountain scene with a clear sky (for example, no visible clouds), the scene analysis block 412 can determine that nothing in the scene is moving because in all N=5 images, the mountains and ground are stationary, and no visible clouds are moving. As another example, if the user takes a picture of the same mountain scene, yet during two of the five images, an insect flies across a horizontal centerline of the scene within view of the camera 200 lens or sensor 208, then the scene analysis block 412 can determine that small amount (namely, one insect object, one direction, few frames) of movement is occurring in the scene. As another example, if the user takes a picture of the same mountain scene, yet in all of the images 303-310, tree foliage being blown in various directions by wind occupies a top right-hand corner of the view of the camera lens or sensor 208, then the scene analysis block 412 can determine that a large amount (namely, several leaf objects, various directions, all frames) of movement is occurring in the scene.

The scene analysis block 412 selects which images within the burst of images 300 will be blended together to form the composite imaged 250. That is, the scene analysis block 412 selects which images to not transfer to the blending module 418. In response to determine that an image has too much motion, in order to improve the blending process, the scene analysis block 412 can select to drop the image from being transferred to the blending module 418. More particularly, the scene analysis block 412 also provides blend control parameters 432 to the blending module 418 indicating a weight of each image in the burst 300. The weight indicates the strength that blending module 418 should apply to corresponding image. An image with a zero weight can be eliminated from the blending process or not relied upon by the blending module 418, and an image with a largest weight can be relied upon heavily for the blending process.

The scene analysis block 412 generates motion control parameters 434 for the Smart Fusion block 416 that uses the motion control parameters 434 to identify the pixels within an image that constitute a moving object within a scene, such as the flying insect or tree foliage.

The interpolation and blending stage includes the HiFi Interpolation block 414, the Smart Fusion block 416, the blending module 418. The interpolation and blending stage computes a set of locally adaptive weights from the transformation estimation. The weights are estimated from an aliasing-retaining interpolation filter, a sharpening filter, a rotation transformation, an upscale transformation, and a sub-pixel image shift. After each frame in the burst 300 has been processed through the locally adaptive weights, the entire set of images 300 is blended together through an average operation to produce a single blended image 440. In certain embodiments, the interpolation and blending stage uses different ISP tuning settings (such as noise filtering or sharpness enhancement) for determining local weights for the local motion determination, but also uses different ISP tuning settings for generating images before blending.

The HiFi Interpolation block 414 compensates or otherwise corrects for affine motion in each image. That is, for each image in the burst of images 300, the HiFi Interpolation block 414 uses the affine matrices associated with that image to generate an unwarped and upscaled version of that image. That is, the output from the pre HiFi Interpolation block 414 is an interpolated version 300c of the burst of images having N images. The HiFi Interpolation block 414 upscales the burst of images by a zoom ratio of approximately 1.5× such that the interpolated version 300c of the burst of images has a larger number of pixels than the burst of images 300. The HiFi Interpolation block 414 includes an aliasing-retaining interpolation filter that comprises a polyphase implementation of digital upscale with a cut-off low-pass filter that is designed to extend well beyond the typical Nyquist frequency, and passes through a significant portion of the first alias. The aliasing-retaining interpolation filter deliberately does not filter out the aliasing components when performing interpolation. The retention of aliasing can be partial or complete, but retaining aliasing in the burst of images until the blending process is intentional in filter design for the HiFi digital zoom. The aliasing retention of the HiFi Interpolation block 414, which is objectionable in a single-frame interpolation algorithm from a quality perspective, helps retain image features and resolution when multiple frames are blended. Blending multiple frames cancels the alias while preserving image features. That is, the single-frame interpolation algorithm and the iterative multi-frame interpolation methods described above do not include aliasing cancellation through blending of multiple frames.

The HiFi Interpolation block 414 implements rotation transformation and sub-pixel shifts through bicubic weight generation based on coordinate transformation. Together with the interpolation filter described above, these rotation transformation and sub-pixel shifts constitute an affine transformation of the image. Splitting an affine transform into upscale and rotate/shift operations, implementing upscale through aliasing-retaining interpolation algorithm, and sharpening before rotation/shift operation are technical advantages of the HiFi Interpolation block 414. The HiFi Interpolation block 414 performs these technically advantageous operations with different characteristics, thereby optimizing output quality while reducing computational load.

In certain embodiments, High Fidelity Digital Zoom system 400 includes a combination of all stages (rotation, shifts, upscaling and sharpening) into one set of locally adaptive weights. In certain embodiments, High Fidelity Digital Zoom system 400 includes a processing block that is combination of aliasing-retaining interpolation, sharpening, rotation, and sub-pixel shifts algorithms that produce one set of locally adaptive weights. The locally adaptive weights are pre-computed, and applied based on pixel shifts from coordinate transformations. A Look-up-Table based method is used to fetch the local weights that are applied in the implementation.

The HiFi Interpolation block 414 uses the locally adaptive weights for upscaling (interpolation), sharpening, rotation, and shifts (integer pixel or sub-pixel) frames. In certain embodiments, the HiFi Interpolation block 414 performs upscaling, sharpening, rotation and shifts as separate operations. In other embodiments, the HiFi Interpolation block 414 performs upscaling, sharpening, rotation and shifts as combined operations in another order. For example, the HiFi Interpolation block 414 can include a combination of upscaling interpolation, sharpening, rotation, and shifts into one set of locally adaptive weights, and a combination of sub-sets into different sets of weights. In certain embodiments, the HiFi Interpolation block 414 processes the N images in the burst of images 300 with a different set of locally adaptive weights depending on affine matrices 430 (i.e., the image registration parameters). In certain embodiments, the HiFi Interpolation block 414 uses locally adaptive weights to implement a geometric transformation (affine or projective/perspective), with sharpening filter in between. In certain embodiments, the HiFi Interpolation block 414 splits the geometric transformation to implement one aspect of interpolation through specialized interpolation kernels (such as an aliasing retaining upscaling kernel) and implement other aspects of the transformation through standard methods (for example bilinear or bicubic or other) or specialized methods.

The Smart Fusion block 416 applies a local motion handling algorithm to the interpolated 300c burst of images to determine which sub-parts of the image have moving objects. The Smart Fusion block 416 generates a weight map or local motion map 436 that indicates which parts of an image have motion and which parts do not. The Smart Fusion block 416 outputs local motion maps 436 to the blending module 418 and to the post-processing block 420 to indicate the location of each pixel that constitutes a moving object. The Smart Fusion block 416 applies a local motion handling algorithm to analyze the local motion within each image in the interpolated burst of images 300c. For example, the Smart Fusion block 416 can determine the location of each pixel that constitutes the flying insect or the blowing tree foliage described in examples above. As another example, the Smart Fusion block 416 can determine the location of each pixel that constitutes a person walking through a scene and distinguish the pixels of the person from the pixels of a stationary background, such as mountains. The Smart Fusion block 416 implements an algorithm to determine the locally adaptive weights. The Smart Fusion block 416 improves performance and accuracy by using up-sampled or down-sampled images for determining the local weights for local motion determination.

The blending module 418 uses local motion maps 436 to ensure that moving objects are not blended together. The blending module 418 receives the interpolated burst of images 300c and blends the N images into a single-blended image 440. Though the blending module 418 can receive all N images, the blend module 418 may exclude an image from the blend process based on the blend control parameters. The location of a pixel in the first image (Image 0) of the interpolated burst of images 300c is the same location of that pixel in the other images in the interpolated burst 300c. Accordingly, each location of a pixel can be either: (1) a high quality pixel selected from the reference frame 306 to be an unblended, or (2) a blend of up to N pixels from the same location in each of the N images in the interpolated burst 300c. For each pixel location, the location motion maps 436 indicate whether a pixel will be blended or not. For each of the N images, the blend control parameters 432 indicate which images with be used for the blend process and a how much weight is assigned to pixels from each image. The single-blended image 440 can include blended pixels at certain locations and unblended pixels at other locations. The blending module 418 uses a weighted averaging operation to perform the blending operation. The multi-frame blending operation performs aliasing cancellation, defect pixel correction, and signal to noise ratio improvement (noise filtering). The local motion maps 436 include weights for the blending function that are determined by the local motion handling algorithm of the Smart Fusion block 416. The blending module 418 uses statistical estimation techniques such as mean, median or other statistic for the purpose of blending multiple images. For example, the blending module 418 can compute the statistical mean (or average) on-the-fly and use the mean as a computationally efficient statistic for blending. The blending module 418 is not limited to uses the statistical average (for example, mean or median), but also can use a standard deviation, a minimum, or a maximum statistic as a computationally efficient statistic that can be computed on-the-fly, or any other statistic computed from the pixels coming from N frames.

In certain embodiments, the HiFi Digital Zoom system 400 uses aliasing retention in a single frame and aliasing cancellation through multiple frames jointly in one application. In other applications, the HiFi Digital Zoom system 400 uses aliasing retention in a single frame separately from aliasing cancellation through multiple frames.

The post-processing stage includes a post-processing block 420 and the second scaling block 422. The post-processing block 420 includes a post-sharpener, a contrast analyzer, and a saturation estimator. The sharpening filter of the post-processing block 420 enhances image details in the interpolated image, and it helps improve sharpness in the overall output composite image 250. A high-pass/band-pass filter is implemented as the sharpening filter. The cut-offs of the filter are visually optimized for a most pleasing output quality. In certain embodiments, the HiFi Digital Zoom system 400 uses a sharpening filter before 408 and after 420 the interpolation algorithm 414 to improve output quality of the composite image 250. In certain embodiments, the HiFi Digital Zoom system 400 enhances image fidelity by using a sharpening filter designed together with the aliasing retaining interpolation filter.

The second scaling block 422 receives a sharpened version 440a of the single-blended image. The second scaling block 422 up-scales the blended image 440a by a remainder zoom ratio using a single-frame interpolation algorithm, such as a bicubic method or other interpolation method. The output from the second scaling block 422 is the composite image 250 at a resolution requested by the user, such as a 9× or 4× resolution of digital zoom. For example, if a user zooms in to a 9× zoom ratio to take a burst of pictures of a scene, then the HiFi Interpolation block 414 applies a 1.5× upscaling such that the blended image 440a needs to be further up-scaled by a remainder 6× zoom ratio for a 9× total zoom ratio. In this example, the total zoom ratio÷the first stage upscaling zoom ratio=the remainder zoom ratio.

According to this disclosure, the High Fidelity Digital Zoom system 400 implements a two-stage digital zoom algorithm including a non-iterative multi-stage blending followed by a single-frame interpolation. The two-stage digital zoom algorithm reduces the complexity of the overall algorithm because a substantial portion of the image quality improvement is realized at a smaller resolution. That is, the image processing occurs at the 1× or 1.5× resolution until the last stage, namely, the second scaling block 422. By comparison, image processing that occurs at the resolution requested by the user (for example, 4× or 9×) increases the processing complexity.

FIG. 5 illustrates a block diagram of a configuration of the user equipment of FIG. 1 in accordance with this disclosure. The embodiment of the UE 100 shown in FIG. 5 is for illustration only. Other embodiments could be used without departing from the scope of the present disclosure. UEs come in a wide variety of configurations, and FIG. 5 does not limit the scope of this disclosure to any particular implementation of a UE. For example, the UE 100 can be a mobile phone including a smart phone, MP3 terminal, tablet PC, and various digital equipment having an embedded camera.

The UE 100 includes an antenna 505, a communication unit 510, a first camera 515, a second camera 200, an audio unit 525, a display unit 102, an input interface 530, sensor 535, memory 540, and processor 545.

The communication unit 510 performs a communication function with a base station or internet server. Further, the communication unit 510 includes a modulator and a demodulator. The modulator transmits a transmitting signal to the transmitter by modulating the signal, and the demodulator demodulates a signal received through the receiver. Here, the modulator and demodulator can be a Long Term Evolution (LTE), Wideband Code Division Multiple Access (WCDMA), Global System for Mobile Communications (GSM), Wireless Fidelity (WIFI), Wireless Broadband (Wi-Bro), Near Field Communication (NFC), or BLUETOOTH (Bluetooth). In the embodiments of the present disclosure, the communication unit 510 is configured with LTE, WIFI, and Bluetooth devices.

The first camera 515 is a camera disposed at the rear side of the portable terminal, and can photograph a high resolution image. The second camera 200 is a camera disposed at the front side of the portable terminal, and can digital photograph.

The audio unit 525 includes a microphone and a speaker. An audio unit 525 processes voice signals generated in a communication mode and processes an audio signal generated in a photographing mode of the camera.

A display unit 102 displays information of an executing application under the control of the processor 545. The display unit 102 may be a liquid crystal display (LCD), OLED, or other display capable of rendering text and/or at least limited graphics, such as from web sites. The input interface 530 is provided with a capacitive type or resistive type, and outputs location information of user's touch (finger touch) to the processor 545. Further, the input interface 530 can include an EMR sensor pad, and detects a pen touch input to transmit to the processor 545. Here, the display unit 102 and input interface 530 can be integrated into one unit. The input interface 530 can include a keypad that the operator of the UE 100 can use a keypad to enter data into the UE 100.

A sensor 535 can include various sensors for detecting movement of the portable terminal. The sensor 535 can be configured with an acceleration sensor, geomagnetic sensor, and/or location detection sensor.

The memory 540 includes an operating system (OS) program 550 and one or more applications 555, such as a camera application. The memory 540 is coupled to the processor 545. Part of the memory 540 could include a random access memory (RAM), and another part of the memory 540 could include a Flash memory or other read-only memory (ROM). The memory 540 has a program memory storing the operating system 550 of the UE 100 and a camera application 555 according to embodiments of the present disclosure, and a data memory storing tables for the operation of the UE and data generated while executing a program.

The camera application 555 provides a specialized multi-frame technology used to produce high fidelity zoom that produces images with improved signal-to-noise ratio, lower aliasing, improved rendering of curvy and angled objects, and improved clarity. The camera application 555 relies on user-handshake (small un-intended micro-movements of the hand) to capture multiple images of a scene from slightly different camera position, and uses computational methods to take advantage of the additional information contained in these images coming from slightly different perspectives and produces high fidelity zoom images. The camera application 555 uses a combination of multi-frame high fidelity zoom and regular non-HiFi digital zoom in a two-stage fashion to reduce complexity or extend zoom ranges.

The processor 545 can include one or more processors or other processing devices and execute the OS program 550 stored in the memory 540 in order to control the overall operation of the UE 100. In some embodiments, the processor 545 includes at least one microprocessor or microcontroller. The processor 545 controls the general operation of the UE 100, and controls a function of generating High Fidelity Digital Zoom for a mobile phone camera according to an embodiment of the present disclosure. That is, the processor 545 is also capable of executing other processes and programs stored in the memory 540, such as operations for generating High Fidelity Digital Zoom for a mobile phone camera. The processor 545 can move data into or out of the memory 540 as required by an executing process. In some embodiments, the processor 545 is configured to execute the applications 555 based on the OS program 550 or in response to signals received from a base station or an operator. The processor 545 is also coupled to the display unit 102. In the UE 100, the processor 545 obtains a still image or moving image by controlling the first camera 515 and/or second camera 200. The processor 545 controls the display unit 102 to display the image selected in an edit mode and to display soft buttons to select a burst capture mode or a HiFi Digital Zoom mode for the camera 200.

Although FIG. 5 illustrates one example of UE 100, various changes may be made to FIG. 5. For example, various components in FIG. 5 could be combined, further subdivided, or omitted and additional components could be added according to particular needs. As a particular example, the processor 545 could be divided into multiple processors, such as one or more central processing units (CPUs) and one or more graphics processing units (GPUs). Also, while FIG. 5 illustrates the UE 100 configured as a mobile telephone or smartphone, UEs could be configured to operate as other types of mobile or stationary devices.

Figure 6:
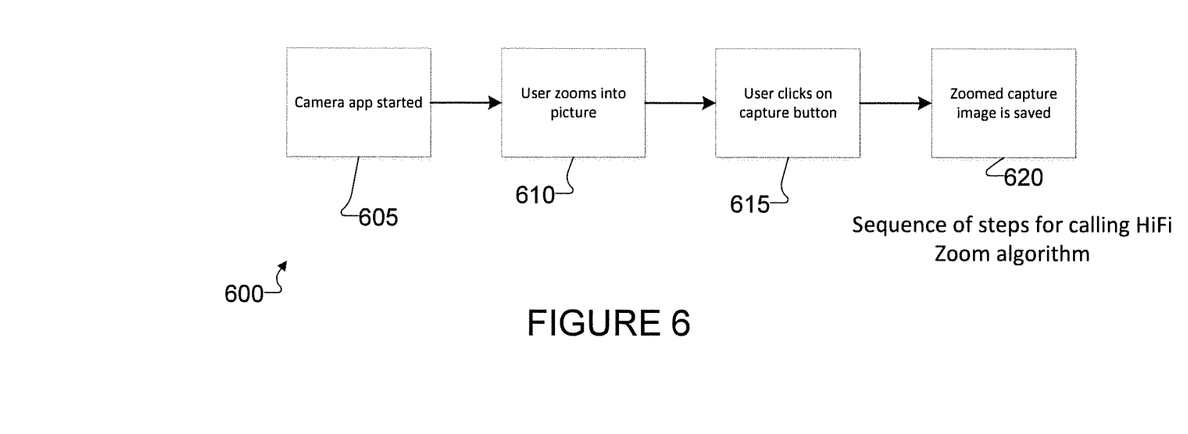
FIG. 6 illustrates a process for selecting a HiFi Zoom algorithm in the example user equipment of FIG. 1 according to this disclosure.

FIG. 6 illustrates a process for selecting a HiFi Zoom algorithm in the UE 100 according to this disclosure. The embodiment of process 600 shown in FIG. 6 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry chain in, for example, a UE.

In block 605, the camera application starts, such as application 555. That is, the processor 545 executes the camera application 555.

In block 610, the user zooms into a picture. That is, the user uses the input interface of the touchscreen display 102 to zoom on a scene to a user desired zoom ratio, such as 9×. In response, the ISP rescaler 212 produces the 9× zoomed images on the display 102 of the UE 100. At the same time, the camera firmware 202 determines that the user has enabled zoom, and determines that the user desired zoom ratio (e.g., 9×) is greater than a threshold value (for example, 1.5×) at which the camera 200 automatically enables HiFi mode. Accordingly, the camera initiates HiFi mode in response to the user clicking on a capture button to take a 9× zoom picture of a scene. In certain embodiments, the camera 200 initiates HiFi mode in response to a manual user selection to enter HiFi mode. For example, the user can use a camera setting menu option to select enabling or disabling high fidelity zoom.

In block 615, the user clicks on the capture button. In response, the camera firmware 202 engages in a custom camera control, such as the burst capture module 204, to capture a burst of images 300. After the burst capture is completed, the camera firmware 202 returns to a default setting to continue to send zoomed images to the display, for example, zoomed to the user desired zoom ratio.

In block 620, a zoomed capture image is saved to the UE memory 540. For example, the HiFi Digital Zoom system 400 processes the burst of images 300 in the background operations of the UE 100. That is, the HiFi Digital Zoom system 400 receives images from the camera pipeline that are captured at a 1×, un-zoomed, resolution, yet the user only sees the user desired zoom ratio on the display 102. The display does not automatically present data to the user indicating that the images are not captured at 9× zoom, but instead captured at 1× resolution and then processed by the HiFi Digital Zoom system 400 into a digitally zoomed image blended imaging having a higher quality than an image produced from other digital zoom methods (e.g., single-frame interpolation algorithm and the iterative multi-frame interpolation methods described above).

Figure 7:
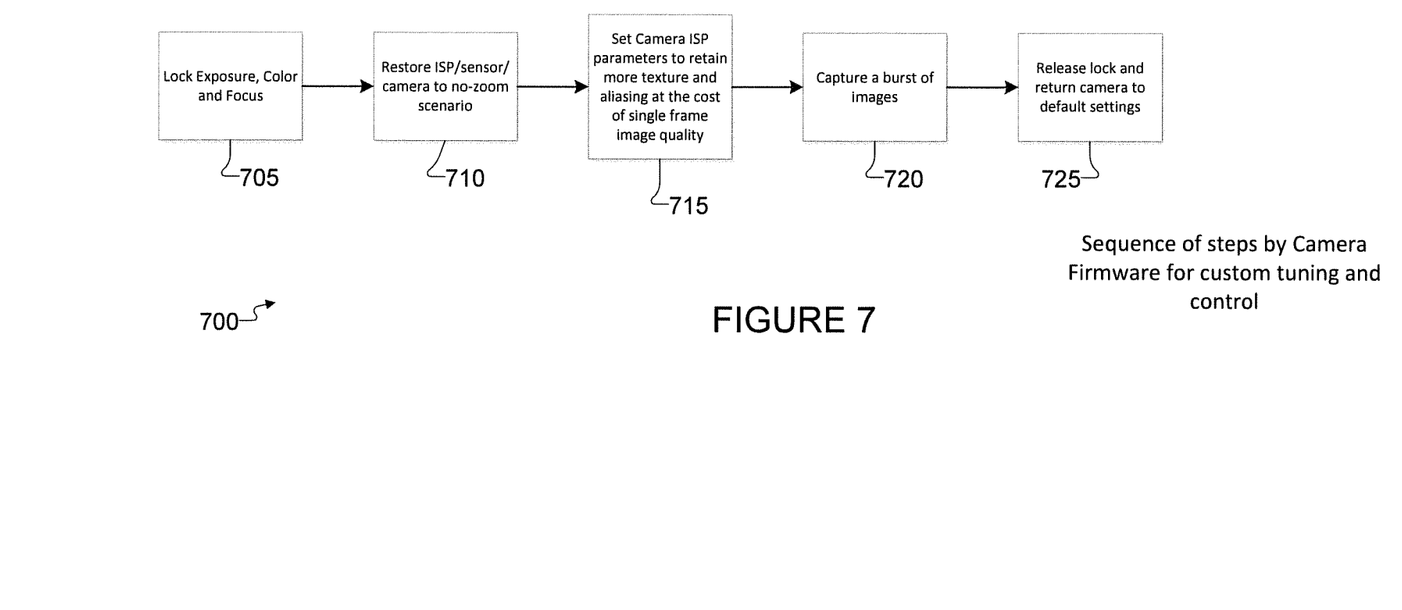
FIG. 7 illustrates a process for custom tuning and control of camera firmware according to this disclosure.

FIG. 7 illustrates a process for custom tuning and control of camera firmware according to this disclosure. The embodiment of the process 700 shown in FIG. 7 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry chain in, for example, a UE. The camera 200 implements the process 700 upon entering the HiFi mode.

In block 705, the exposure, color, and focus are locked. More particularly, in HiFi mode, the camera application 555 configures the camera firmware 202 to perform auto-exposure lock, auto-focus lock, and auto-white/color balance lock (collectively called 3A lock) while the burst of images is captured (i.e., during the burst capture period 312).

In block 710, the camera 200 restores the ISP 212 and the sensor 208 to a no-zoom (i.e., 1× zoom ratio) scenario. That is, the camera captures images during the burst capture period and performs image processing on the burst of images 300 at the 1× no-zoom resolution.

In block 715, the camera firmware 202 sets the ISP 210 parameters 224 to retain more texture and aliasing at the cost of single frame image quality. That is, the firmware 202 generates "tuning" parameters 224 that are more suitable for image texture retention. The camera firmware 202 enables the ISP 210 to perform reduced noise filtering, reduced pixel defect correction, and reduced interpolation aliasing cancellation. Each of the ISP processed images 228a-228e may have a lower quality than if processed by the ISP 210 in non-HiFi mode, yet the aliasing retention causes the blended image 440 and composite image 250 produced by the HiFi Digital Zoom system 400 to have a higher quality than the image that would have been output from the ISP 210 in non-HiFi mode.

In block 720, the camera captures a burst of images 300. After the burst capture period 312, the camera 200 returns to a non-HiFi default mode by releasing the 3A lock in block 725.

Figure 8:
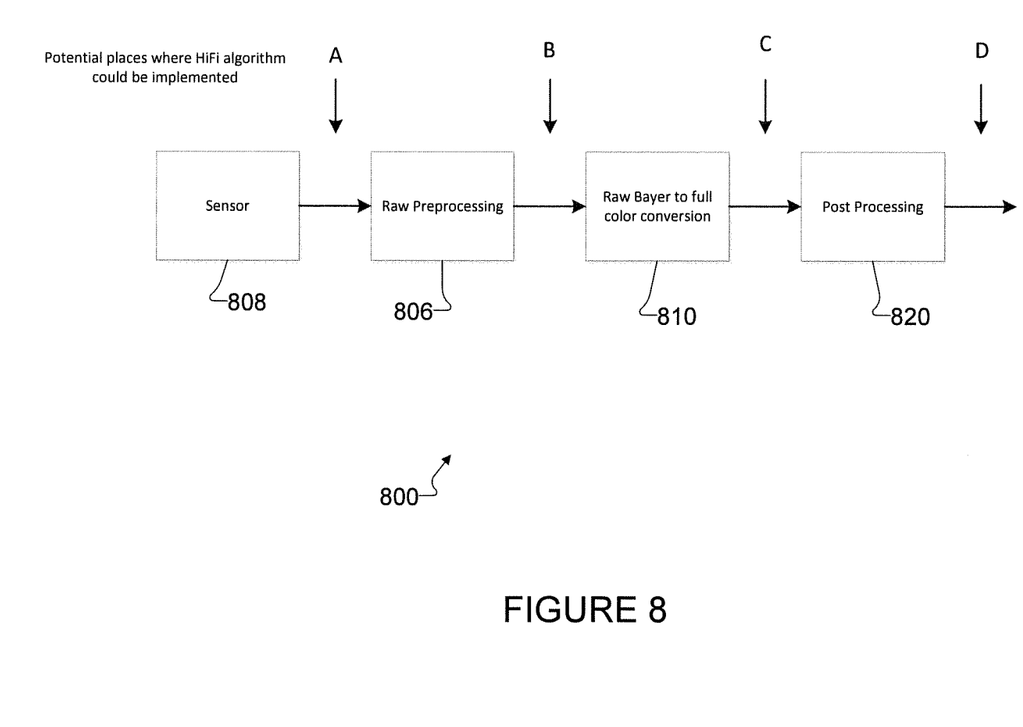
FIG. 8 illustrates various places within an imaging processing architecture where a HiFi Digital Zoom system and algorithm could be implemented an example user equipment according to this disclosure.

FIG. 8 illustrates various places within an imaging processing architecture where the HiFi Digital Zoom system 400 and its associated algorithm could be implemented an example UE according to this disclosure. The UE image processing architecture 800 shown in FIG. 8 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry chain in, for example, a UE. The UE 800 could be the same or similar to the UE 100, and the components of the UE image processing architecture 800 could be the same or similar to the corresponding components of the UE 100.

The camera firmware is configured to use either: (1) fully processed images for HiFi zoom, (2) partially processed images for HiFi zoom, or (3) un-processed raw images from the camera sensor 808 for multi-frame HiFi zoom. The camera firmware is configured to execute the High Fidelity Zoom (multi-stage blending algorithm) as either the last stage of the processing pipeline, the intermediate stage, or the first stage.

In certain embodiments, the camera firmware implements the multi-frame high fidelity zoom through a pre-capture of multiple frames in a buffer followed by post-processing of the algorithm in an "off-line" fashion. In other embodiments, the camera firmware implements the multi-frame high fidelity zoom through a live capture of multiple frames followed by on-the-fly processing of the multi-stage blending algorithm. The camera firmware implements the multi-stage blending algorithm partially or fully in hardware.

The UE image processing architecture 800 includes an image sensor 808 for capturing a burst of images, a raw pre-processing block 806, a raw Bayer to full color conversation 810, and a post processing block 820 for applying sharpness enhancement, noise filtering, and contrast enhancement. The raw pre-processing block 806 can include a noise reduction filter (for example, noise filter 406) and a sharpness enhancement processes (such as, a pre-sharpener 408). The raw pre-processing block 806 further implements a block level compensation, a vignetting correction, a defect correction, atone mapping, a dynamic range nonlinearity analysis, and so forth.

The UE image processing architecture 800 includes the raw pre-processing block 806, such as the ISP 210. The raw pre-processing block 806 implements demosaicing, gamma conversation, and color conversion. Also, the post processing block 820 implements sharpness enhancement, noise filtering and contrast enhancement.

The algorithm if the HiFi Digital Zoom system 400 can be implemented at location A, between the sensor 808 and the raw pre-processing 806. Alternatively, the algorithm if the HiFi Digital Zoom system 400 can be implemented at location B, C, or D. Location B is between the raw pre-processing 806 and the raw Bayer to full color conversation 810. Location C is between the raw Bayer to full color conversation 810 and the post processing 820. Location D is after the post processing 820.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A non-transitory computer readable medium embodying a computer program, the computer program comprising computer readable program code that, when executed by processing circuitry, causes the processing circuitry to:
   capture, by a digital camera, a burst of N images;
   for each image within the burst of images:
      analyze an amount of warp of the image and generate a set of affine matrices indicating the amount of warp of the image,
      generate an interpolated image by:
         performing affine transformation using the set of affine matrices associated with the image,
         applying an aliasing-retaining interpolation filter, and
         implementing rotation transformation and sub-pixel shifts; and
      blend the N interpolated images into a single-blended image having a user-selected digital zoom ratio.

2. The non-transitory computer readable medium of claim 1, wherein the computer program further comprises computer readable program code that, when executed by the processing circuitry, causes the processing circuitry to:
   automatically lock an auto-exposure, an auto-focus, and an auto-white/color balance of the digital camera while the burst of images is captured.

3. The non-transitory computer readable medium of claim 1, wherein the computer program further comprises computer readable program code that, when executed by the processing circuitry, causes the processing circuitry to:
   generate and transmit a set of parameters to an image signal processor (ISP) of the digital camera, wherein the parameters are configured to cause the ISP to perform at least one of: reduced noise filtering, reduced pixel defect correction, and reduced interpolation aliasing cancellation.

4. The non-transitory computer readable medium of claim 1, wherein the computer program further comprises computer readable program code that, when executed by the processing circuitry, causes the processing circuitry to:
   canceling aliasing by blending the N images into the single-blended image.

5. The non-transitory computer readable medium of claim 1, wherein the computer program further comprises computer readable program code that, when executed by the processing circuitry, causes the processing circuitry to:
   sharpen the interpolated burst of images prior to blending the N images into the single-blended image.

6. The non-transitory computer readable medium of claim 1, wherein the computer program further comprises computer readable program code that, when executed by the processing circuitry, causes the processing circuitry to:
  upscale the single-blended image by a remainder zoom ratio using a single-frame interpolation algorithm, wherein the remainder zoom ratio equals a user-selected zoom ratio divided by an upscaling zoom ratio to which the interpolated image is upscaled.

7. The non-transitory computer readable medium of claim 1, wherein the computer program further comprises computer readable program code that, when executed by the processing circuitry, causes the processing circuitry to:
  select a reference frame from the burst of N images based on the reference frame having at least one of:
    least motion difference from other images in the burst of N images,
    a specified frame number,
    a highest sharpness.

8. The non-transitory computer readable medium of claim 1, wherein the computer program further comprises computer readable program code that, when executed by the processing circuitry, causes the processing circuitry to:
  receive the user-selected digital zoom ratio;
  based on a determination that the user-selected digital zoom ratio is above a threshold value, upscale the burst of images using a high fidelity digital zoom;
  based on a determination that the user-selected digital zoom ratio is above a threshold value, upscale the burst of images using a single-frame interpolation.

9. A mobile device comprising:
  an embedded digital camera configured to capture a burst of N images;
  processing circuitry comprising:
    a registration module configured to, for each image within the burst of images: analyze an amount of warp of the image and generate a set of affine matrices indicating the amount of warp of the image;
    a High Fidelity (HiFi) Interpolation block configured to, for each image within the burst of images: perform affine transformation using the set of affine matrices associated with the image, apply an aliasing-retaining interpolation filter, and implement rotation transformation and sub-pixel shifts, yielding an interpolated image; and
    a blending module configured to receive the N interpolated images and blend the N interpolated images into a single-blended image having a user-selected digital zoom ratio.

10. The mobile device of claim 9, wherein the processing circuitry is configured to:
  automatically lock an auto-exposure, an auto-focus, and an auto-white/color balance of the embedded digital camera while the burst of images is captured.

11. The mobile device of claim 9, wherein the processing circuitry is configured to:
  generate and transmit a set of parameters to an image signal processor (ISP) of the embedded digital camera, where the parameters are configured to cause the ISP to perform at least one of: reduced noise filtering, reduced pixel defect correction, and reduced interpolation aliasing cancellation.

12. The mobile device of claim 9, wherein the blending module is configured to:
  cancel aliasing by blending the N images into the single-blended image.

13. The mobile device of claim 9, wherein the processing circuitry is configured to:
  sharpen the interpolated burst of images prior to blending the N images into the single-blended image.

14. The mobile device of claim 9, wherein the processing circuitry comprises:
  second-frame interpolation block configured to upscale the single-blended image by a remainder zoom ratio using a single-frame interpolation algorithm, wherein the remainder zoom ratio equals a user-selected zoom ratio divided by an upscaling zoom ratio of the HiFi Interpolation block.

15. The mobile device of claim 9, wherein the processing circuitry further comprises:
  a reference frame selection module configured to select a reference frame from the burst of N images based on the reference frame having at least one of:
    least motion difference from other images in the burst of N images,
    a specified frame number,
    a highest sharpness.

16. The mobile device of claim 9, wherein the processing circuitry is further configured to:
  receive the user-selected digital zoom ratio;
  based on a determination that the user-selected digital zoom ratio is above a threshold value, upscale the burst of images using a high fidelity digital zoom;
  based on a determination that the user-selected digital zoom ratio is above a threshold value, upscale the burst of images using a single-frame interpolation.

17. A system comprising:
  processing circuitry configured to couple to a mobile device comprising an embedded digital camera configured to capture a burst of N images, the processing circuitry comprising:
    a registration module configured to, for each image within the burst of images: analyze an amount of warp of the image and generate a set of affine matrices indicating the amount of warp of the image;
    a High Fidelity (HiFi) Interpolation block configured to, for each image within the burst of images: perform affine transformation using the set of affine matrices associated with the image, apply an aliasing-retaining interpolation filter, and implement rotation transformation and sub-pixel shifts, yielding an interpolated image; and
    a blending module configured to receive the N interpolated images and blend the N interpolated images into a single-blended image having a user-selected digital zoom ratio.

18. The system of claim 17, wherein the processing circuitry is configured to:
  automatically lock an auto-exposure, an auto-focus, and an auto-white/color balance of the embedded digital camera while the burst of images is captured.

19. The system of claim 17, wherein the processing circuitry is configured to:
  generate and transmit a set of parameters to an image signal processor (ISP) of the embedded digital camera, where the parameters are configured to cause the ISP to perform at least one of: reduced noise filtering, reduced pixel defect correction, and reduced interpolation aliasing cancellation.

20. The system of claim 17, wherein the blending module is configured to:
   cancel aliasing by blending the N images into the single-blended image.

\* \* \* \* \*